(12) United States Patent
Civiero

(10) Patent No.: US 11,401,005 B2
(45) Date of Patent: Aug. 2, 2022

(54) COGSET WITH INCREASING JUMP

(71) Applicant: CAMPAGNOLO S.r.l., Vicenza (IT)

(72) Inventor: Mirco Civiero, Montecchia di Crosara (IT)

(73) Assignee: CAMPAGNOLO S.r.l., Vicenza (IT)

( * ) Notice: Subject to any disclaimer, the term of this patent is extended or adjusted under 35 U.S.C. 154(b) by 264 days.

(21) Appl. No.: 16/748,366

(22) Filed: Jan. 21, 2020

(65) Prior Publication Data

US 2020/0239105 A1    Jul. 30, 2020

(30) Foreign Application Priority Data

Jan. 29, 2019   (IT) .................. 102019000001281

(51) Int. Cl.
*B62M 9/10*       (2006.01)
*F16H 55/30*      (2006.01)

(52) U.S. Cl.
CPC ............... *B62M 9/10* (2013.01); *F16H 55/30* (2013.01)

(58) Field of Classification Search
CPC ....................................................... B62M 9/10
USPC ........................................................ 474/160
See application file for complete search history.

(56) References Cited

U.S. PATENT DOCUMENTS

| | | | | |
|---|---|---|---|---|
| 5,503,598 A | * | 4/1996 | Neuer | B62M 9/10 474/160 |
| 5,716,297 A | * | 2/1998 | Bodmer | B62M 9/10 474/160 |
| 5,738,603 A | | 4/1998 | Schmidt et al. | |
| 6,537,173 B2 | * | 3/2003 | Mercat | B62M 9/10 475/213 |
| 9,403,578 B1 | | 8/2016 | Yoshida et al. | |

(Continued)

FOREIGN PATENT DOCUMENTS

| | | |
|---|---|---|
| CN | 1126684 A | 7/1996 |
| CN | 105691543 A | 6/2016 |

(Continued)

OTHER PUBLICATIONS

European Search Report for App. No. 20 15 3829.5-1009, dated Jun. 5, 2020.

(Continued)

*Primary Examiner* — Henry Y Liu
(74) *Attorney, Agent, or Firm* — Volpe Koenig

(57) ABSTRACT

A cogset having a plurality of axially adjacent sprockets between a first sprocket with a minimum primitive circumference and a last sprocket with a maximum primitive circumference and the primitive circumferences are expressed as an integer dimensionless value equal to the ratio between the primitive circumference itself and a fixed length equal to a chain pitch. The difference in value between the primitive circumference of the sprocket next to a predetermined sprocket and the primitive circumference of the predetermined sprocket is defined as the jump associated with the predetermined sprocket. A first sprocket subset comprises the first sprocket and at least the next three sprockets and a second sprocket subset comprises at least three adjacent sprockets that do not include the first sprocket. The jump associated with all of the sprockets of the first subset is equal to 1, whereas the jump associated with the sprockets of the second subset increases by 1 from one sprocket to the next.

8 Claims, 1 Drawing Sheet

(56) References Cited

U.S. PATENT DOCUMENTS

| | | | |
|---|---|---|---|
| 2001/0041641 A1 | 11/2001 | Mercat et al. | |
| 2007/0049437 A1 | 3/2007 | Wickliffe | |
| 2011/0065541 A1* | 3/2011 | Lai | B62M 9/10 474/160 |
| 2012/0208662 A1* | 8/2012 | Braedt | B62M 9/10 474/160 |
| 2012/0225745 A1* | 9/2012 | Oishi | B62M 9/121 474/160 |
| 2012/0302384 A1* | 11/2012 | Braedt | B62M 9/10 474/160 |
| 2015/0080160 A1* | 3/2015 | Staples | B62M 9/12 474/160 |
| 2016/0167737 A1* | 6/2016 | Tokuyama | B62M 9/10 474/160 |
| 2017/0233037 A1* | 8/2017 | Hara | B62M 9/14 474/78 |
| 2018/0251189 A1* | 9/2018 | Kamada | B62M 9/12 |
| 2019/0092427 A1* | 3/2019 | Oka | B60B 27/023 |
| 2019/0113123 A1* | 4/2019 | Civiero | B60B 27/04 |
| 2019/0225301 A1* | 7/2019 | Emura | F16H 55/12 |
| 2019/0225302 A1* | 7/2019 | Emura | B62M 9/12 |
| 2019/0263473 A1* | 8/2019 | Braedt | B62M 9/105 |
| 2019/0300109 A1* | 10/2019 | Yamazaki | F16H 55/30 |
| 2019/0359284 A1* | 11/2019 | Fukunaga | B62M 9/10 |
| 2020/0140033 A1* | 5/2020 | Kamada | F16H 55/30 |
| 2020/0269953 A1* | 8/2020 | Fukunaga | B62M 9/10 |

FOREIGN PATENT DOCUMENTS

| | | |
|---|---|---|
| CN | 106240732 A | 12/2016 |
| CN | 107082102 A | 8/2017 |
| CN | 108528618 A | 9/2018 |
| CN | 108688771 A | 10/2018 |
| EP | 0 700 823 A1 | 3/1996 |
| EP | 1 188 658 A2 | 3/2002 |
| EP | 1 426 283 A2 | 6/2004 |

OTHER PUBLICATIONS

Italian Search Report and Written Opinion in Italian Application No. 102019000001281, dated Jan. 29, 2019, with English translation.

* cited by examiner

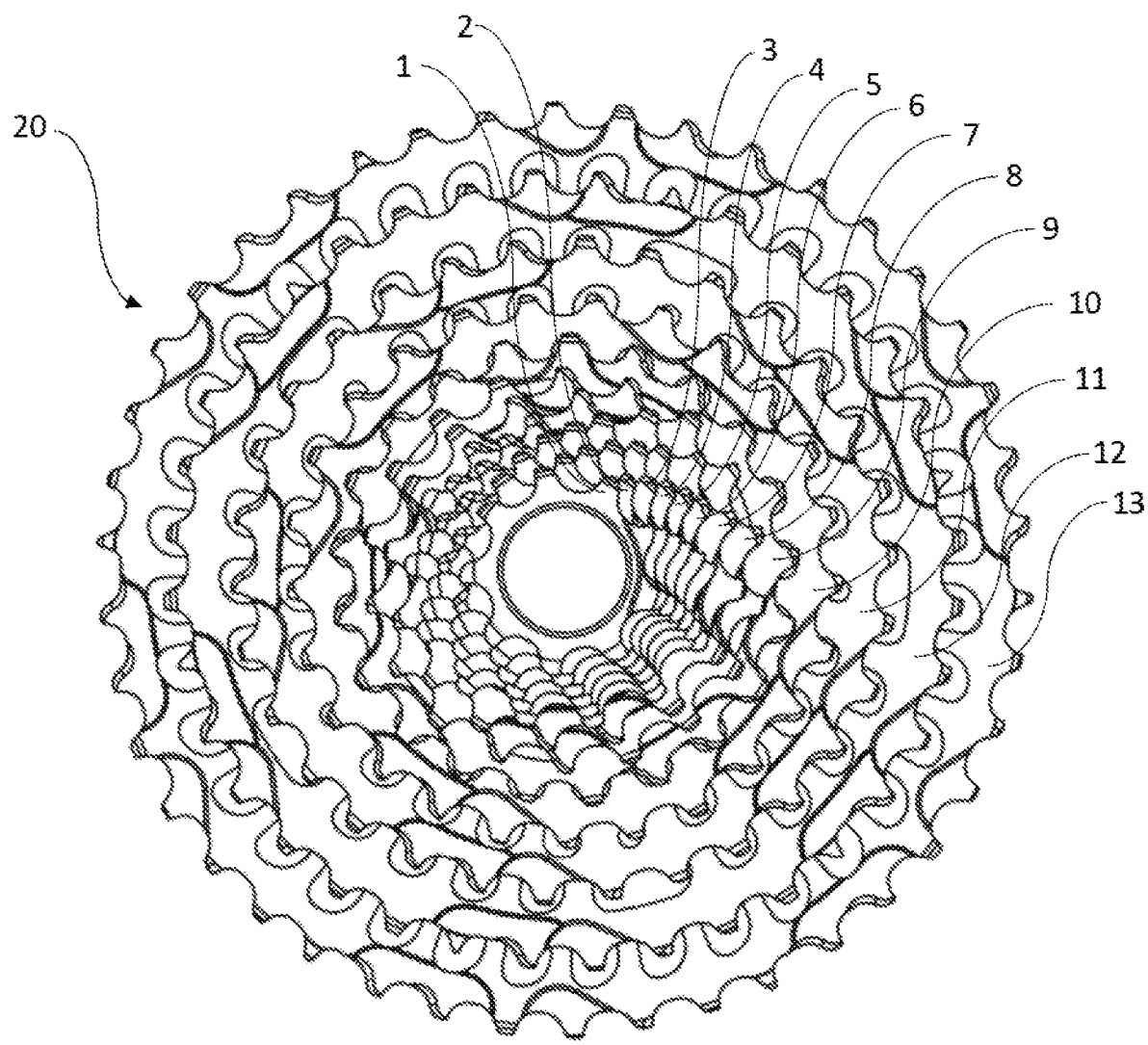

COGSET WITH INCREASING JUMP

CROSS REFERENCE TO RELATED APPLICATION(S)

This application claims the benefit of Italian Application No. 102019000001281, filed on Jan. 29, 2019 and Italian Application No. 102019000018758, filed on Oct. 14, 2019, which are incorporated herein by reference as if fully set forth.

FIELD OF INVENTION

The present invention relates generally to a cogset for a bicycle rear wheel. More particularly, the invention relates to cogsets used in competitions. Most particularly, the invention relates to cogsets used in competitions where there are road and off-road conditions.

BACKGROUND

When a bicycle is used in competition, or when it is used by very demanding users, the cogset mounted on the rear wheel is frequently selected on a case by case basis based on the terrain to be covered. Therefore, if there is level terrain on asphalt road, a cogset with relatively small sprockets will be mounted, so as to have long gear ratios and allow the cyclist to develop high speeds; these cogsets are normally designated as "road". Vice-versa, if there is terrain with very irregular road surface and/or steep slopes, a cogset with relatively large sprockets will be mounted, so as to have short gear ratios and allow the cyclist to better develop a high torque at low speed; these cogsets are normally designated as "off road".

Of course, it is possible that the terrain to be tackled is mixed, with sections that would require a "road" cogset and sections that would require an "off road" cogset; this is the case for example of so-called "gravel" competitions, well known particularly in North America, which take place on paved roads, unpaved roads and pathways. In this case, cogsets called "gravel" are used, which try to provide a compromise between "road" and "off road" ones.

However, the search for this compromise is anything but easy, given the fundamentally opposite nature of the requirements of the cyclist in different conditions. Known "gravel" cogsets aim to simply combine in the same cogset both very small sprockets (for road use), and very large sprockets (for off-road use).

Therefore, there is a problem of improving the features of a "gravel" cogset so that it manages to better satisfy the multiple requirements of the most demanding cyclists.

SUMMARY

To address the above terrain issues, the present invention relates to a cogset comprised of multiple sprockets that are arranged in sprocket subsets with different "jumps" between sprockets. The primitive circumference of each sprocket is expressed as an integer dimensionless value equal to the ratio between the primitive circumference itself and a fixed length equal to a chain pitch; the difference in value between the primitive circumference of the sprocket after a predetermined sprocket and the primitive circumference of the predetermined sprocket is defined as the jump associated with the predetermined sprocket of the plurality of sprockets. A first sprocket subset, that comprises the first sprocket and at least the next three sprockets, and a second sprocket subset, that comprises at least three adjacent sprockets among which the first sprocket is not included, are defined among the sprockets; the jump associated with all of the sprockets of the first subset is equal to 1, and the jump associated with the sprockets of the second subset increases by 1 from one sprocket to the next. In this way, the cyclist has at least five long gear ratios available, minimally spaced apart, so as to optimally satisfy the requirements on regular and level roads, whereas the transition towards short or ultra-short gear ratios takes place in a sharp but still gradual manner at the sprockets of the second subset.

BRIEF DESCRIPTION OF THE DRAWING

Further features and advantages of the invention will become clearer from the following description of some preferred embodiments thereof, made with reference to the attached drawing. In such drawing:

FIG. 1 is a front planar view of a cogset according to the invention.

DETAILED DESCRIPTION OF A PREFERRED EMBODIMENT

Hereinafter, spatial indications, such as in particular those of radial, axial and circumferential direction, will be given with reference to the rotation axis of the rear wheel of the bicycle, which coincides with the axis of the cogset, of the sprocket-carrying body, of the hub of the wheel and in general of all of the elements that rotate with the wheel. Moreover, the axial direction will be indicated as towards the outside if directed away from the longitudinal mid-plane of the bicycle or away from the hub of the wheel, and vice-versa as towards the inside if directed towards such a mid-plane or towards the hub.

The invention relates to a cogset, comprising a plurality of axially adjacent sprockets between a first sprocket having minimum primitive circumference and a last sprocket having maximum primitive circumference, wherein the primitive circumference of each sprocket is expressed as an integer dimensionless value equal to the ratio between the primitive circumference itself and a fixed length equal to a chain pitch, wherein the difference in value between the primitive circumference of the sprocket after a predetermined sprocket and the primitive circumference of the predetermined sprocket is defined as jump associated with the predetermined sprocket of the plurality of sprockets, wherein a first sprocket subset, that comprises the first sprocket and at least the next three sprockets, and a second sprocket subset, that comprises at least three adjacent sprockets among which the first sprocket is not included, are defined among the sprockets; the cogset is characterized in that the jump associated with all of the sprockets of the first subset is equal to 1, and in that the jump associated with the sprockets of the second subset increases by 1 from one sprocket to the next.

The primitive circumference of a sprocket is a magnitude habitually used and defined as the ideal circumference traveled by the center of the pins of the rollers of a chain engaged with the sprocket in rotation. It is therefore the theoretical circumference that is used for the calculation of the gear ratios, since it is along this that the trajectory of the chain develops. The dimensionless value of the primitive circumference as defined above (ratio between such a circumference and the pitch of the chain) is thus normally equal to the number of teeth of the sprocket itself.

In this way, the cyclist has at least five long gear ratios available, minimally spaced apart, so as to optimally satisfy the requirements on regular and level roads, whereas the transition towards short or ultra-short gear ratios takes place in a sharp but still gradual manner at the sprockets of the second subset. It has been found that in this way the cyclist has excellent travel and gearshifting conditions in a very wide variety of terrain conditions.

Preferably, the first sprocket set comprises at least five sprockets. Thus, the long gear ratios minimally spaced apart are six, widening the range available to the cyclist for travel on regular and level roads.

Preferably, the jump associated with the first sprocket of the second subset is equal to or greater than 2. This implies that the second sprocket subset comprises at least three sprockets, with jump of 2, 3 and 4 respectively; the conditions for a quick transition from gear ratios for regular and level roads to shorter gear ratios for roads with an irregular surface and/or uphill and vice-versa are thus determined.

Preferably, the last sprocket is not included in the second sprocket subset. In this way, the transition area between the long gear ratios and the short gear ratios remains comprised in the intermediate sprockets of the cogset; this allows more freedom in the choice of the shorter gear ratios of the cogset.

Preferably, the second sprocket subset comprises at least four sprockets, more preferably at least five sprockets. The transition from gear ratios for regular and level roads to shorter gear ratios for roads with an irregular surface and/or uphill and vice-versa is thus well distributed.

Preferably, the jump associated with every sprocket of the cogset is equal to or greater than the jump associated with the previous sprocket. This feature means that a gradual progression between the gear ratios is ensured, both for longer gear ratios and for shorter gear ratios. Indeed, it should be kept in mind that the relative increase in gear ratio when the chain moves between two adjacent sprockets is proportional to the jump, but inversely proportional to the circumference of the sprockets; therefore, as the circumference of the sprockets increases, having a jump that also increases indeed helps to maintain a certain regularity in the progression of the gear ratios.

In a particular embodiment, the largest sprocket of the first subset coincides with the smallest sprocket of the second subset. This makes it possible to have the transition area between the long and short gear ratios immediately after the area reserved for the long gear ratios, thus leaving more sprockets available for the area with the shorter gear ratios.

The FIGURE shows a cogset 20, which comprises thirteen sprockets, numbered from 1 to 13. The sprockets 1-13 have increasing primitive circumference values, from a minimum for the sprocket 1 to a maximum for the sprocket 13, and also increasing jump values, according to the following table:

| sprocket | circumference value | jump |
| --- | --- | --- |
| 1 | 9 | 1 |
| 2 | 10 | 1 |
| 3 | 11 | 1 |
| 4 | 12 | 1 |
| 5 | 13 | 1 |
| 6 | 14 | 2 |
| 7 | 16 | 2 |
| 8 | 18 | 3 |
| 9 | 21 | 4 |
| 10 | 25 | 5 |
| 11 | 30 | 6 |
| 12 | 36 | 6 |
| 13 | 42 | |

Clearly, the value of the jump for the larger sprocket 13 is not determined, since there is no sprocket after it.

As can be seen from the table, a first sprocket subset formed by the five sprockets 1-5, which have a jump value always equal to 1, is defined among the sprockets 1-13. A second sprocket subset is also defined, formed by the five sprockets 7-11, which have a jump value that increases by 1 between one sprocket and the next: 2, 3, 4, 5, 6 respectively.

The five sprockets 1-5 of the first subset together with the next sprocket 6 are those that provide the cyclist with six long gear ratios, suitable for travel on regular and level roads. These gear ratios are relatively close together (thanks to the jump 1 of the sprockets 1-5) and allow the cyclist to have a very accurate choice of the gear ratio.

The five sprockets 7-11 of the second subset together with the next sprocket 12, on the other hand, are those that provide the cyclist with a series of six intermediate gear ratios, of gradual and progressive transition between the long gear ratios and the short gear ratios.

In this embodiment, the two subsets of sprockets are separate from one another, i.e. there is no sprocket that simultaneously belongs to both subsets.

A different embodiment provides for the following situation:

| sprocket | circumference value | jump |
| --- | --- | --- |
| 1 | 9 | 1 |
| 2 | 10 | 1 |
| 3 | 11 | 1 |
| 4 | 12 | 1 |
| 5 | 13 | 1 |
| 6 | 14 | 2 |
| 7 | 16 | 2 |
| 8 | 18 | 2 |
| 9 | 20 | 3 |
| 10 | 23 | 4 |
| 11 | 27 | 4 |
| 12 | 31 | 5 |
| 13 | 36 | |

As can be seen from the table, a first sprocket subset formed by the five sprockets 1-5, which have a jump value always equal to 1, is defined between the sprockets 1-13. A second sprocket subset is also defined, formed by the three sprockets 8-10, which have a jump value that increases by 1 between one sprocket and the next: 2, 3 and 4 respectively.

The five sprockets 1-5 of the first subset together with the next sprocket 6 are those that provide the cyclist with six long gear ratios, suitable for travel on regular and level roads. In this sprocket subset, the situation is the same as in the previous embodiment.

The three sprockets 8-10 of the second subset together with the next sprocket 11, on the other hand, are those that provide the cyclist with four intermediate gear ratios, of gradual and progressive transition between the long gear ratios and the short gear ratios. With respect to the previous embodiment, here the transition appears shorter, on four sprockets instead of on six, however it should be noted that the circumference values of the larger sprockets are smaller than those of the previous embodiment, i.e. the gear ratios are less short.

Also in this embodiment, the two sprocket subsets are separate from one another, i.e. there is no sprocket that simultaneously belongs to both sets.

A different third embodiment provides for the following situation:

| sprocket | circumference value | jump |
|---|---|---|
| 1 | 10 | 1 |
| 2 | 11 | 1 |
| 3 | 12 | 1 |
| 4 | 13 | 1 |
| 5 | 14 | 1 |
| 6 | 15 | 2 |
| 7 | 17 | 2 |
| 8 | 19 | 3 |
| 9 | 22 | 4 |
| 10 | 26 | 6 |
| 11 | 32 | 6 |
| 12 | 38 | 6 |
| 13 | 44 | |

As can be seen from the table, a first sprocket subset formed by the five sprockets 1-5, which have a jump value always equal to 1 is defined between the sprockets 1-13. A second sprocket subset is also defined, formed by the three sprockets 7-9, which have a jump value that increases by 1 between one sprocket and the next: 2, 3 and 4 respectively.

The five sprockets 1-5 of the first subset together with the next sprocket 6 are those that provide the cyclist with six long gear ratios, suitable for travel on regular and level roads. In this sprocket subset, the situation is the same as in the previous embodiments.

The three sprockets 7-9 of the second subset together with the next sprocket 10, on the other hand, are those that provide the cyclist with four intermediate gear ratios, of gradual and progressive transition between the long gear ratios and the short gear ratios. With respect to the previous embodiment, here the transition is moved more towards the smaller sprockets; on the other hand, the gear ratios of the larger sprockets are shorter.

Also in this embodiment, the two sprocket subsets are separate from one another, i.e. there is no sprocket that simultaneously belongs to both subsets.

It is anyway possible for the last sprocket of the first subset to also be the first sprocket of the second subset.

What is claimed is:

1. A cogset comprising a plurality of axially adjacent sprockets arranged between a first sprocket having a minimum primitive circumference and a last sprocket having a maximum primitive circumference, wherein the primitive circumference of each sprocket is expressed as an integer dimensionless value equal to a ratio between the primitive circumference itself and a fixed length equal to a chain pitch, wherein difference in value between primitive circumference of the sprocket after a predetermined sprocket and primitive circumference of the predetermined sprocket is defined as the jump associated with the predetermined sprocket of the plurality of sprockets, wherein a first sprocket subset comprising the first sprocket and at least the next three sprockets, and a second sprocket subset comprising at least three adjacent sprockets, which do not include the first sprocket, are defined among the plurality of axially adjacent sprockets and, wherein the jump associated with all of the sprockets of the first sprocket subset is equal to 1, and the jump associated with sprockets of the second sprocket subset increases by 1 from one sprocket to the next sprocket.

2. The cogset according to claim 1, wherein the first sprocket subset comprises at least five sprockets.

3. The cogset according to claim 1, wherein the jump associated with the first sprocket of the second sprocket subset is equal to or greater than 2.

4. The cogset according to claim 1, wherein the last sprocket is not included in the second sprocket subset.

5. The cogset according to claim 1, wherein the second sprocket subset comprises at least four adjacent sprockets.

6. The cogset according to claim 1, wherein the second sprocket subset comprises at least five adjacent sprockets.

7. The cogset according to claim 1, wherein the jump associated with every sprocket of the cogset is equal to or greater than the jump associated with the previous sprocket.

8. The cogset according to claim 1, wherein the largest sprocket of the first sprocket subset coincides with the smallest sprocket of the second sprocket subset.

* * * * *